INVENTOR.
Herman Y. Stephens
BY
William S. Dorman
ATTORNEY

Aug. 3, 1965 H. Y. STEPHENS 3,198,179
MULTIPLE PISTON INTERNAL COMBUSTION
ENGINE WITH PUMP COMPRESSION
Filed Feb. 28, 1962 2 Sheets-Sheet 2

INVENTOR.
Herman Y. Stephens
BY
William S. Dorman
ATTORNEY

3,198,179
MULTIPLE PISTON INTERNAL COMBUSTION ENGINE WITH PUMP COMPRESSION
Herman Y. Stephens, 1510 N. Lewis Place, Tulsa, Okla.
Filed Feb. 28, 1962, Ser. No. 176,351
1 Claim. (Cl. 123—51)

This invention relates to improvements in internal combustion engines, and more particularly, but not by way of limitation, to an internal combustion engine having intake and firing cylinders particularly designed and constructed for providing an economy of fuel consumption and an increase in the power performance of the engine.

The conventional types of internal combustion engines available today are usually provided with intake and firing cylinders having substantially the same piston diameters and equal strokes. The firing stroke normally consumes one-half of a revolution of the crank shaft, and the exhaust valves open at or near the bottom of the firing stroke for exhaust of the fired gases before all of the power of the explosion of the fuel in the combustion chamber has been used. At approximately the mid-point of the travel of the piston during the firing stroke, the crank shaft cycle begins to pull the piston rod back on a reverse angle, which results in a reduction of power at this point in the stroke. As a result, all of the thrust or power of the explosion occurs between the top of the stroke and the first quarter of the revolution of the crank shaft. The intake and firing cylinders of the present day internal combustion engines is such that the full power of the exploded gases in the combustion chamber is not utilized, and much of the fuel and spent or fired gases are exhausted from the chamber without the maximum efficiency thereof, which not only increases the fuel consumption, but also reduces the power performance of the engine, which results in an inefficiency of operation.

The present invention contemplates an improved internal combustion engine wherein the intake cylinder and the firing cylinder are so constructed and arranged as to provide an increased efficiency in fuel consumption, and reduction of power loss for greatly increasing the overall economy and operating results of the engine. The intake and compression chamber is of a relatively smaller size, or shorter stroke than the firing cylinder or combustion cylinder whereby substantially all of the fuel from the intake chamber is injected into the combustion chamber for firing which provides an economy of fuel consumption in that there is substantially not waste of fuel. In addition, the fuel from the intake chamber is injected into the combustion chamber at or near the top of the firing stroke and upon the exhaust of the previously fired gases. Thus, substantially all of the expanding gas pressure from the exploision may be utilized before the larger or longer piston reaches the bottom of the stroke. This results in a greater pressure per square inch of the piston with approximately the same quantity of gas or fuel from the intake cylinder. In addition, the pressure on the crank shaft, or rotating shaft is at the optimum leverage of the shaft cycle before the exhaust valves open, and before any substantial quantity of the residue gases from the explosion are exhausted from the combustion chamber. This results in an increased power from the explosion in that substantially the complete combustion power is utilized since the firing piston reaches the bottom of its stroke before the exhaust valves open.

It is an important object of this invention to provide an improved internal combustion engine particularly designed and constructed for an increased efficiency of fuel consumption to provide a greater economy of operation.

It is another object of this invention to provide an improved internal combustion engine having an increased efficiency in utilization of the explosion power from the ignition of the fuel in the combustion chamber.

Still another object of this invention is to provide an improved internal combustion engine utilizing the optimum leverage of the crank shaft cycle for increasing the operating efficiency of the engine.

A further object of this invention is to provide an improved internal combustion engine wherein substantially all of the fuel from the intake chamber is injected into the combustion chamber for reducing wastage of the fuel during operation of the engine.

A still further object of this invention is to provide an improved internal combustion engine wherein an increased pressure per square inch of firing piston is provided with substantially the same quantity of fuel from the intake chamber to provide an increased operating efficiency.

Still another object of this invention is to provide an improved internal combustion engine which is simple and efficient in operation and economical and durable in construction.

Other and further objects and advantageous features of the present invention will hereinafter more fully appear in connection with a detailed description of the drawings in which.

Figure 1:
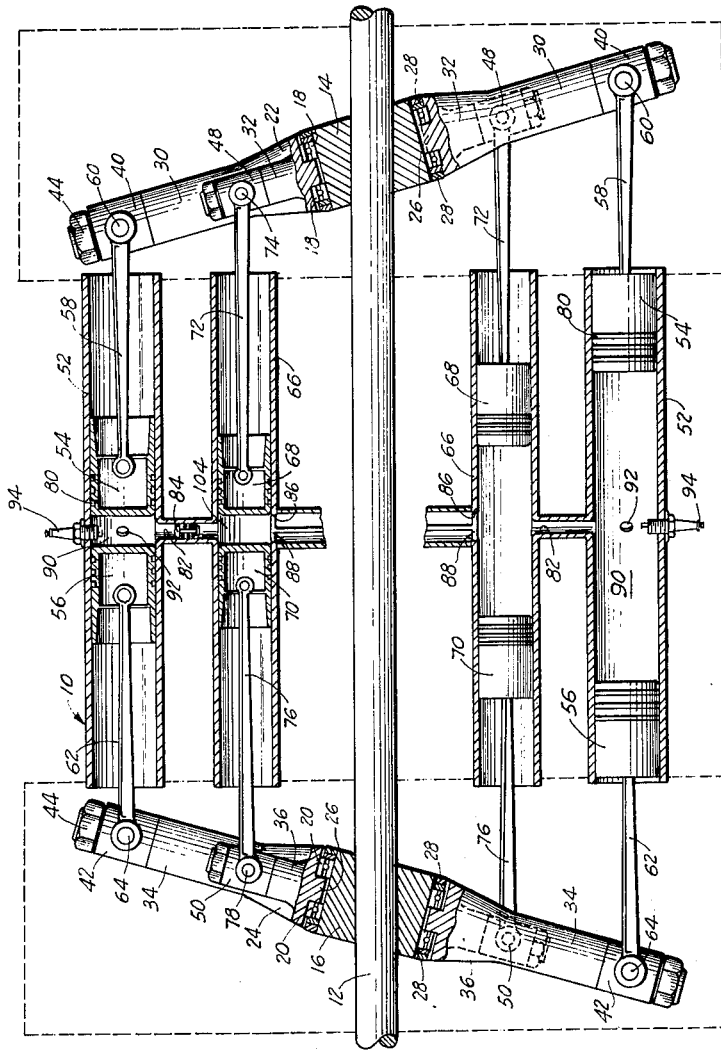
FIGURE 1 is a side elevational view, partly in section, of one type of internal combustion engine embodying the invention.

Referring to the drawings in detail, reference character 10 generally indicates an internal combustion engine of the so-called crankless opposed piston type, but it is to be understood that the invention is not limited to this type of engine, but may be utilized with substantially any type of internal combustion engine. The engine 10 comprises a central shaft 12 directly secured to a flywheel (not shown) in any well known manner. A pair of spaced inclined hub members 14 and 16 are keyed or otherwise secured to the shaft 12 each for supporting a plurality of suitably spaced bearings 18 and 20, respectively. The hub members 14 and 16 are oppositely disposed, as clearly shown in FIGURE 1, and each supports an outer hub member 22 and 24, respectively, which is concentric therewith. The outer hubs 22 and 24 are loosely disposed on the inner hubs 14 and 16 in any suitable manner whereby the inner hubs are rotatable with respect thereto. As depicted herein, each of the outer hubs 22 and 24 is provided with an inwardly directed flange 26 on the inner periphery thereof adjacent the respective inner hub and adapted for disposition between the spaced bearings 18 and spaced bearings 20. Suitable locking rings 28 may be secured around the opposed ends of the inner hubs 14 and 16 in order to retain the bearings 18 and 20 securely in position thereon, as is well known, and to assure an efficient rotation of the inner hubs with respect to the outer hubs. The outer hubs 22 and 24 are held against rotation in a manner and for a purpose as will be hereinafter set forth.

A plurality of circumferentially spaced radially extending spindles 30 and 32 are provided on the outer periphery of the hub 22, and a plurality of similar spindles 34 and 36 are provided on the hub 24. As particularly shown in FIGURE 1, two pairs of the spindles 30 and 32 are oppositely disposed on the hub 22, and two pairs of the spindles 34 and 36 are provided on the hub 24. However, it is to be understood that substantially any desired number of the complementary pairs of spindles may be provided on the hubs in accordance with the desired engine cycle. In addition, it will be apparent that the eccentric construction of the inner hubs 14 and 16 cants the opposed spindles, as shown in FIGURE 1.

The spindles 30 and 34 are substantially identical and are preferably in substantial alignment, as are the spindles 32 and 36. The spindles 30 and 34 are of a greater length than the respective spindles 32 and 36, and each may be provided with a reduced portion 38, (FIGURE 2) at the outer end thereof for receiving suitable flanged bushings 40 and 42 (FIGURE 1), respectively. The bushings 40 and 42 may be secured to the respective spindles 30 and 34 by means of nuts 44, or the like. The spindles 32 and 36 are each similarly provided with a reduced portion 46 at the outer end thereof for receiving suitable flanged bushings 48 and 50, respectively.

A power cylinder, or firing cylinder 52 is disposed between the outer extremities of the aligned spindles 30 and 34. A pair of pistons 54 and 56 are oppositely disposed and slidable within the cylinder 52. The piston 54 is connected to the spindle 30 by an arm member 58 which is pivotally secured to the bushing 40 at 60. The piston 56 is similarly secured to the spindle 34 by an arm member 62 which is pivotally secured to the bushing 42 at 64. A second cylinder, or intake cylinder 66 is disposed between the shorter spindles 32 and 36, and spaced inwardly from the firing cylinder 52. A pair of pistons 68 and 70 are oppositely disposed and slidable within the cylinder 66. The piston 68 is connected to the spindle 32 by an arm member 72 which is pivotally secured to the bushing 48 at 74. The piston 70 is similarly connected with the spindle 36 by an arm member 76 which is pivotally secured to the bushing 50 at 78. It will be apparent that the pistons 54, 56, 68 and 70 may be provided with suitable piston rings 80, if desired, and as is well known. The intake cylinder is preferably of a smaller diameter than the power cylinder 52 whereby the capacity of the intake cylinder is less than that of the power cylinder.

The intake cylinder 66 is in communication with the firing cylinder 52 through a passageway 82, which is provided with any suitable checking valve arrangement, generally indicated at 84. The intake cylinder 66 is also provided with an intake port 86 having a suitable intake valve 88 provided therein, and in communication with a carburetor, or the like (not shown) for receiving the usual gasoline-air mixture, or other fuel therefrom, as is well known. The firing cylinder or power cylinder 52 is provided with a combustion chamber 90 between the inner ends of the opposed pistons 54 and 56. An exhaust port 92 is provided in the combustiion chamber, and is provided with any suitable exhaust valve (not shown), as is well known. In addition, a suitable igniter, or spark plug 94 extends into the combustion chamber for ignition of the fuel therein.

Figure 2:
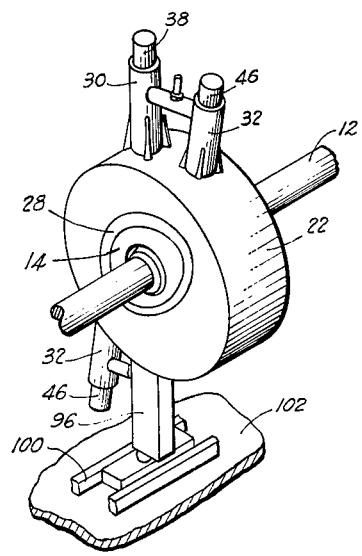
FIGURE 2 is a perspective view of an eccentric hub portion of the engine depicted in FIGURE 1.
Figure 3:
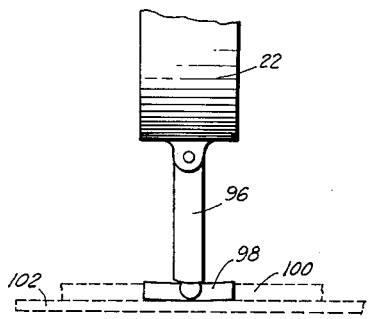
FIGURE 3 is an enlarged side elevational view of a portion of the eccentric hub shown in FIGURE 2, and particularly depicting the hub retaining mechanism.

As hereinbefore set forth, the outer hub members 22 and 24 are held against rotation in any suitable manner. As disclosed herein, a radially extending arm member 96, FIGURES 2 and 3, is pivotally secured to the outer periphery of each of the hubs 22 and 24 and is provided with a transversely extending pivotal shoe member 98. The shoe member 98 is slidably disposed in a slot or recess 100 provided on a base member 102, which may be the supporting base for the engine 10. Thus, the outer hubs 22 and 24 cannot rotate, since the slot 100 limits any sideways movement of the shoe 98. However, the shoe 98 is free to reciprocate within the slot 100, which permits the outer hubs 22 and 24 to change in angular position, or wobble, as will be hereinafter set forth.

*Operation*

In operation, the fuel mixture present within the combustion chamber 90, such as shown in the upper portion of FIGURE 1, is fired or ignited by the spark plug member 94 in the usual manner upon starting of the engine, and the resultant explosion, acting equally in all directions, moves the opposing pistons 54 and 56 in opposite outward directions in the cylinder 52. The action of the pistons 54 and 56 is transmitted to the spindles 30 and 34 through the arms 58 and 62, thus urging the spindles 30 and 34 in opposite directions, and away from each other. Since the outer hubs 22 and 24 cannot rotate, the eccentric inner hubs 14 and 16 are forced to rotate with respect thereto in order to maintain the concentricity with the outer hubs. The rotation of the inner hubs 14 and 16 is transmitted to the shaft 12 through the rigid connection therewith, which in turn transmits rotation to the flywheel (not shown). The momentum of the flywheel continues the rotation of the shaft 12 sufficiently for returning the spindles 30 and 34 to the original inwardly directed position, as viewed in the upper portion of FIGURE 1, for forcing the spent or burned fuel residue from the combustion chamber 90 through the exhaust port 92. The exhaust valve (not shown) may be actuated in any well known manner for opening to discharge the exhaust gases from the chamber 90 at the desired timing of the piston stroke, which is preferably at or near the bottom of the stroke.

As shown herein, two opposed power cylinders 52 are utilized, thus providing a two cycle engine. However, it is to be understood that substantially any desired number of the power or firing cylinders 52 may be provided in accordance with the desired engine cycle. Of course, the sequential firing of the fuel in the combustion chambers provided in the plurality of power or firing cylinders acting on all the sets of spindles increases the rotational speed of the shaft 12, thus the greater the number of power cylinders, the more powerful the engine.

As the spindles 30 and 34 are moved in a direction away from each other, the spindles 32 and 36 are simultaneously moved therewith whereby the pistons 68 and 70 are pulled in opposite directions, and away from each other. The outward movement of the pistons 68 and 70 within the cylinder 66 creates a suction therebetween whereby the intake valve 88 is opened and a charge of fuel is pulled into the intake chamber 104. As hereinbefore set forth, the intake cylinder 66 is so designed that the intake chamber 104 thereof is of less capacity than the firing chamber 90. In addition, it will be apparent from FIGURE 1 that the length of travel of the arms 72 and 76 will be less than that of the arms 58 and 62, thus providing a shorter stroke for the pistons 68 and 70 than that of the pistons 54 and 56. Thus, the capacity of the intake chamber 104 will be less than that of the firing chamber 90, even if the diameter of the cylinders 52 and 66 are substantially the same. Therefore the volumetric displacement or displacement capacity can be decreased by decreasing the diameter of the cylinders, by decreasing the stroke of the pistons or by decreasing both. Furthermore, it will be apparent that the valve 88 may be opened by suitable valve lifters (not shown), or the like, in cooperation with a cam surface (not shown), which may be provided on the shaft 12, and as is well known.

The reverse movement of the spindles 32 and 36 moves the pistons 68 and 70 in a direction toward each other for compressing the fuel contained in the intake chamber 104 and forcing the fuel out of the intake chamber and into the passageways 82. The force of the fuel opens the check valve 84 whereby the compressed fuel is discharged into the firing chamber 90. Since the capacity of the intake chamber 104 is less than the capacity of the firing chamber 90, substantially the entire fuel mixture forced from the intake cylinder into the power cylinder will be burned upon ignition thereof by the spark plug 94, thus resulting in very little or no fuel waste, and providing an increased gasoline or fuel mileage for the vehicle using the engine.

In addition, the fuel mixture is injected into the combustion chamber at or near the top of the stroke of the pistons 54 and 56 whereby substantially all of the power from the explosion of the fuel will be used during the first portion or quarter of the piston stroke. This takes advantage of the optimum timing of the stroke and leverage of the shaft 12 to provide a maximum power for the engine without additional fuel, or superchargers, or the like. Thus, the power performance of the engine is greatly increased.

The continued repetition of the firing and exhausting of the fuel residue in the cylinder 52, or all of the power cylinders, continually rotates the shaft 12 and provides an efficient and economical internal combustion engine.

From the foregoing, it will be apparent that the present invention provides an internal combustion engine particularly designed and constructed for fuel economy and increased power performance. The novel engine is provided with an intake cylinder having a capacity less than that of the power cylinder whereby substantially the entire fuel mixture introduced into the combustion chamber will be burned upon ignition thereof. This results in use of the full power of the combustible mixture or fuel, and greatly reduces waste of the fuel. In addition, the compressed fuel mixture is admitted or injected into the firing chamber at the optimum timing of the piston stroke to take advantage of the full power of the combustion. The novel invention provides an internal combustion engine which is simple and efficient in operation and economical and durable in construction.

Whereas, the present invention has been described in particular relation to the drawings attached hereto, it should be understood that other and further modifications, apart from those shown or suggested herein, may be made within the spirit and scope of this invention.

What is claimed is:
An internal combustion engine comprising
a plurality of spaced power cylinders,
an intake cylinder in association with each power cylinder and having less capacity than the said power cylinder,
opposed piston means slidably disposed in each power cylinder,
opposed piston means provided in each intake cylinder and having a shorter stroke than the first mentioned piston means,
outer hub means connected with all of the said piston means and movable thereby,
inner hub means concentric with the outer hub means and rotatable with respect thereto,
shaft means rigidly secured to the inner hub means,
and said inner hub means angularly disposed with respect to the shaft means whereby the inner hub transmits rotation to the shaft upon movement of the outer hub means.

References Cited by the Examiner
UNITED STATES PATENTS

| 1,077,956 | 11/13 | Fox | 123—68 |
| 1,473,486 | 11/23 | McCallen | 123—68 |
| 1,609,371 | 12/26 | Leissner | 123—68 |
| 2,421,868 | 6/47 | Bovee | 123—58 |
| 3,007,462 | 11/61 | Balzer | 123—51 |

FOREIGN PATENTS

| 692,660 | 6/40 | Germany. |
| 740,446 | 11/55 | Great Britain. |

FRED E. ENGELTHALER, *Primary Examiner.*
RICHARD B. WILKINSON, *Examiner.*